United States Patent [19]
Baserman et al.

[11] Patent Number: 5,870,254
[45] Date of Patent: Feb. 9, 1999

[54] TRANSDUCER SUSPENSION SYSTEM

[75] Inventors: Erik Baserman, Los Gatos; Charles D. Cullom, III, San Jose; Norman Kermit Frater, Los Gatos; Brad Vaughn Johnson, Santa Clara; William Harlow McConnell, Los Altos Hills, all of Calif.

[73] Assignee: International Business Machines Corporation, Armonk, N.Y.

[21] Appl. No.: 881,217

[22] Filed: Jun. 24, 1997

[51] Int. Cl.⁶ .............................. G11B 5/60; G11B 21/21
[52] U.S. Cl. ............................................................ 360/104
[58] Field of Search ............................................. 360/104

[56] References Cited

U.S. PATENT DOCUMENTS

| | | | |
|---|---|---|---|
| 4,346,416 | 8/1982 | Riggle et al. | 360/106 |
| 4,796,122 | 1/1989 | Levy et al. | 360/98.01 |
| 4,829,395 | 5/1989 | Coon et al. | 360/104 |
| 4,870,525 | 9/1989 | Wong et al. | 360/137 |
| 4,875,117 | 10/1989 | Slezak et al. | 360/98.01 |
| 5,014,142 | 5/1991 | Nakanishi et al. | 360/98.01 |
| 5,172,286 | 12/1992 | Jurgenson | 360/104 |
| 5,187,626 | 2/1993 | Hopkins et al. | 360/104 |
| 5,260,847 | 11/1993 | Basehore et al. | 360/106 |
| 5,299,082 | 3/1994 | Ananth et al. | 360/106 |
| 5,444,587 | 8/1995 | Johnson et al. | 360/104 |
| 5,459,921 | 10/1995 | Hudson et al. | 29/603 |
| 5,461,524 | 10/1995 | Jurgenson | 360/104 |
| 5,475,549 | 12/1995 | Marder et al. | 360/104 |
| 5,546,649 | 8/1996 | Shimanuki | 29/603.03 |

OTHER PUBLICATIONS

TDB –vol. 37 No. 12 Dec. 1994 –Asymmetrical Head Disk Alignment.

*Primary Examiner*—Robert S. Tupper
*Attorney, Agent, or Firm*—Douglas R. Millett

[57] ABSTRACT

In a disk drive system transducer suspensions are swaged to the actuator arms. The end actuator arms in the arm stack experience unbalanced forces which detrimentally effect the flying height of the transducers. A compensating swage plate is swaged on the opposite surface of each of the end actuator arms such that these unbalanced forces are canceled and the transducer maintains the proper flying height.

10 Claims, 4 Drawing Sheets

TRANSDUCER SUSPENSION SYSTEM

BACKGROUND OF THE INVENTION

1. Field of the Invention

This invention relates generally to transducer suspension systems and more particularly to a suspension system which compensates for actuator arm bending.

2. Description of the Prior Art

Direct access storage devices (DASD), or disk drives, store information on concentric tracks of a rotatable magnetic recording disk. A magnetic head or transducer element is moved from track to track to record and reads the desired information. Typically, the magnetic head is positioned on an air bearing slider which flies above the surface of the disk as the disk rotates. In some recently proposed disk drives, the slider (or carrier) rides on a liquid film or bearing on the disk. A suspension assembly connects the slider to a rotary or linear actuator. The suspension assembly provides support for the slider.

Examples of suspension systems are shown in the following references: U.S. Pat. No. 5,546,649, issued Aug. 20, 1996, to Shimanuki; U.S. Pat. No. 5,475,549, issued Dec. 12, 1995, to Marder et al; U.S. Pat. No. 5,461,524, issued Oct. 24, 1995, to Jurgenson; U.S. Pat. No. 5,459,921, issued Oct. 24, 1995, to Hudson et al; U.S. Pat. No. 5,444,587, issued Aug. 22, 1995, to Johnson et al; U.S. Pat. No. 5,299,082, issued Mar. 29, 1994, to Ananth et al; U.S. Pat. No . 5,260,847, issued Nov. 9, 1993, to Basehore et al; U.S. Pat. No . 5,187,626, issued Feb. 16, 1993, to Hopkins et al; U.S. Pat. No . 5,172,286, issued Dec. 15, 1992, to Jurgenson; U.S. Pat. No. 5,014,142, issued May 7, 1991, to Nakanishi et al; U.S. Pat. No. 4,875,117, issued Oct. 17, 1989, to Slezak et al; U.S. Pat. No. 4,870,525, issued Sept. 26, 1989, to Wong et al; U.S. Pat. No. 4,829,395, issued May 9, 1989, to Coon et al; U.S. Pat. No. 4,796,122, issued Jan. 3, 1989, to Levy et al; U.S. Pat. No. 4,346,416, issued Aug. 24, 1982, to Riggle et al; and IBM Technical Disclosure Bulletin Vol. 37, No. 12, Dec. 1994, page 181.

The suspension is attached to an actuator arm of the actuator motor. The actuator motor is used to move the transducer head from track to track on the recording disk. High capacity disk drives typically have a plurality of recording disks arranged in a disk stack. Actuator arms which are located between two disks typically have two suspensions attached, one to access the disk surface above and one to access the disk surface below. However, actuator arms on each end of the stack (top and bottom arms) have only one suspension attached which accesses a single disk surface. Disk drives which have a single disk typically have an actuator arm above the disk and an actuator arm below the disk, each having a single suspension.

The inventors have discovered that in multiple disk files the transducer heads on the actuator arms having a single suspension have higher data error rates than transducer heads on actuator arms having two suspensions. This invention was designed to solve this problem.

SUMMARY OF THE INVENTION

Briefly, in a preferred embodiment of the present invention, suspensions are swaged to each actuator arm in a disk drive using a swage plate. A compensating swage plate is used on actuator arms having a single suspension. The compensating swage plate has an increased volume in the swage spud which exerts a compensating moment on the actuator arm. This compensating moment cancels out the unbalancing bending moment which a single suspension actuator arm experiences and thereby prevents the actuator arm tip from bending. The transducer head is able to maintain the proper flying height and the data error rate is reduced.

Alternatively, the compensating plate may be swaged using a larger swage tool than the normal swage plate such that a similar compensating moment is exerted within the actuator arm.

For a fuller understanding of the nature and advantages of the present invention, reference should be made to the following detailed description taken in conjunction with the accompanying drawings.

DESCRIPTION OF THE PREFERRED EMBODIMENTS

Figure 1:
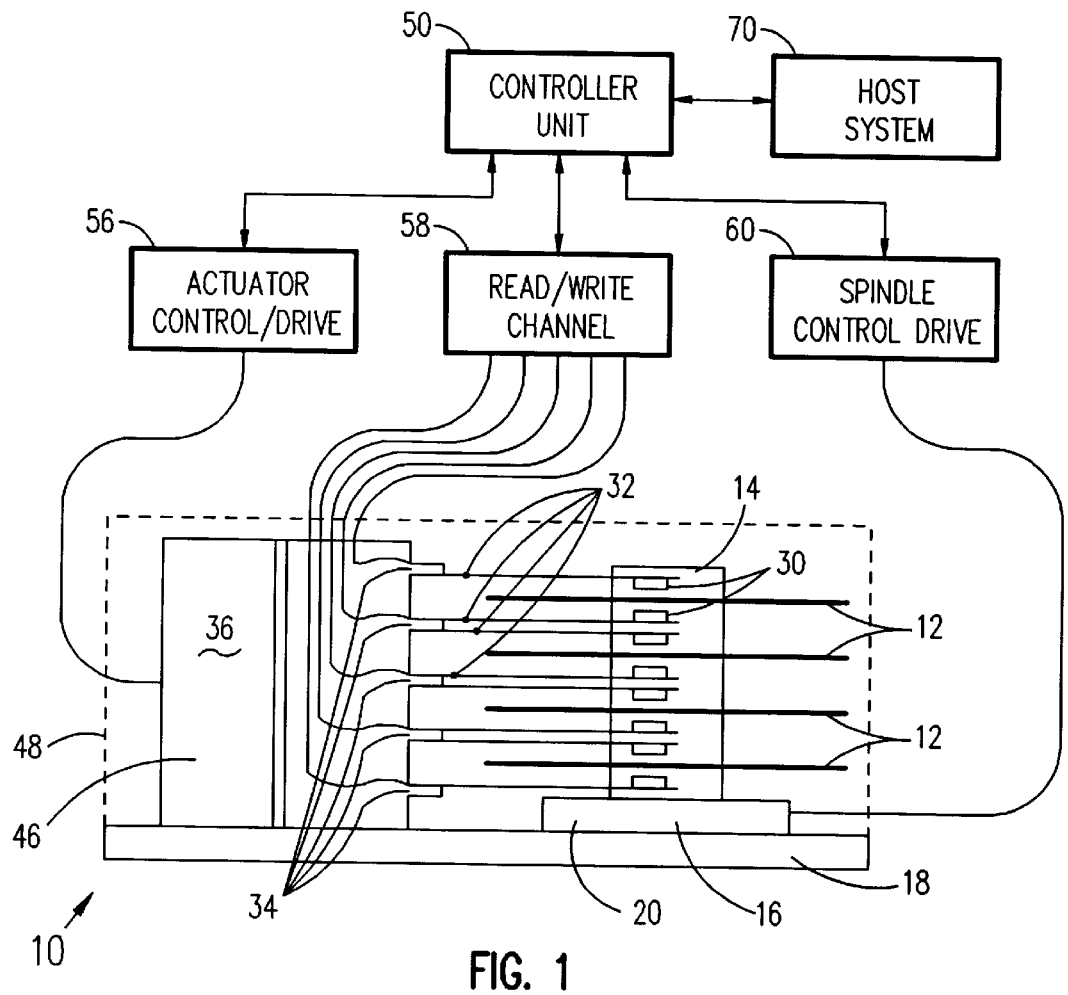
FIG. 1 is a schematic diagram of a data storage system of the present invention.
Figure 2:
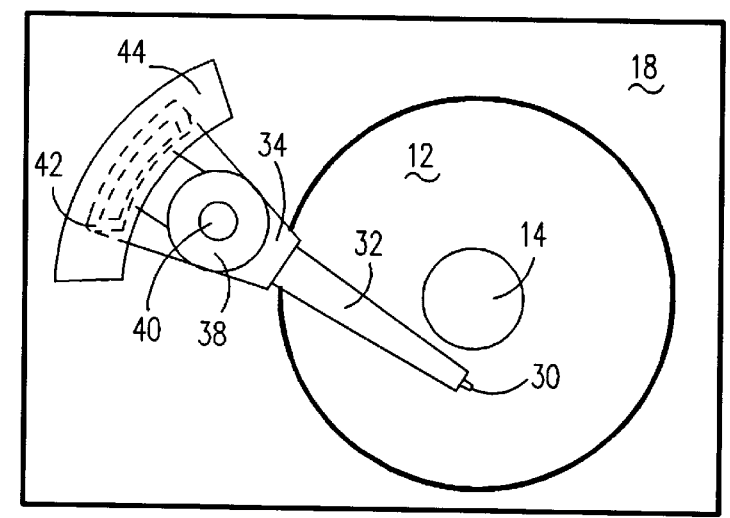
FIG. 2 is a top view of the system of FIG. 1.

FIGS. 1 and 2 show schematic diagrams of the data storage system of the present invention which is designated by the general reference number 10. System 10 comprises a plurality of magnetic recording disks 12. Each disk has a plurality of concentric data tracks. Disks 12 are mounted on a spindle motor shaft 14, which is connected to a spindle motor 16. Motor 16 is mounted to a chassis 18. The disks 12, spindle 14, and motor 16 comprise a disk stack assembly 20.

A plurality of read/write heads 30 are positioned over the disks 12 such that each surface of the disks 12 have a corresponding head 30. Each head 30 is attached to one of a plurality of suspensions 32 which in turn are attached to a plurality of actuator arms 34. Arms 34 are connected to a rotary actuator 36. Actuator 36 moves the heads in a radial direction across disks 12. Actuator 36 typically comprises a rotating member 38 mounted to a rotating bearing 40, a motor winding 42, and motor magnetics 44. Actuator 36 is also mounted to chassis 18. Although a rotary actuator is shown in the preferred embodiment, a linear actuator could also be used. The heads 30, suspensions 32, arms 34, and actuator 36 comprise an actuator assembly 46. The disk stack assembly 20 and the actuator assembly 46 are sealed in an enclosure 48 (shown by dashed line) which provides protection from particulate contamination.

A controller unit 50 provides overall control to system 10. Controller unit 50 typically contains a central processing unit (CPU), memory unit, and other digital circuitry. Controller 50 is connected to an actuator control/drive unit 56 which in turn is connected to actuator 36. This allows controller 50 to control the movement of heads 30 over disks 12. The controller 50 is connected to a read/write channel 58 which in turn is connected to the heads 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 70 may send digital data to controller 50 to be store on disks 12 or may request the digital data be read from disks 12 and sent to the system 70. The basic operation of DASD units is well known in the art and is described in more detail in "Magnetic Recording Handbook", C. Dennis Mee and Eric D. Daniel, McGraw Hill Book Company, 1990.

Figure 3:
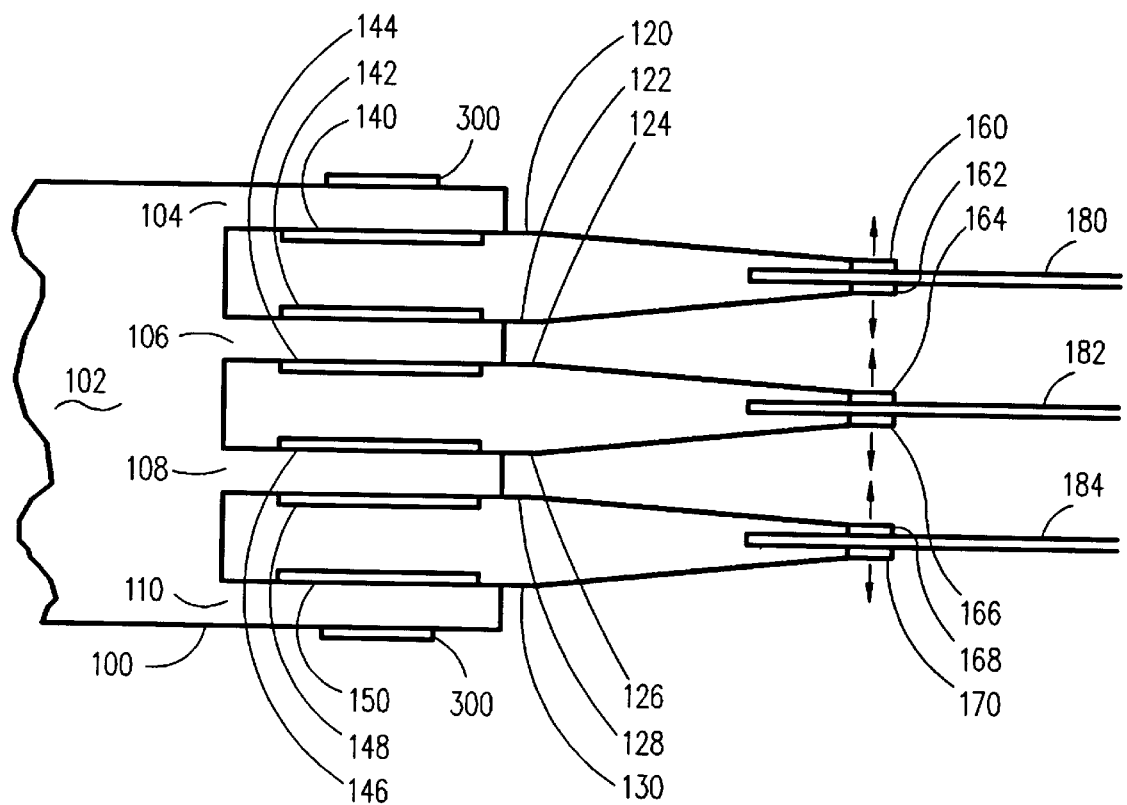
FIG. 3 is a side view of an actuator arm assembly of the system of FIG. 1.

FIG. 3 shows a side view of an actuator arm assembly and is designated by the general reference number 100. Assembly 100 comprises an actuator comb 102 having a plurality of actuator arms 104, 106, 108, and 110. In a preferred embodiment, the comb and actuator arms are made of a single piece of aluminum. Alternatively, the comb may be made of an assembly of separate pieces, such as separate actuator arms and spacer members. A plurality of suspensions 120–130 are attached to the actuator arms 104–110 by a plurality of swage plates 140–150, respectively.

Each of suspensions 120–130 has a corresponding transducer slider 160–170, respectively. The sliders 160–170 contain the transducer elements which enable the disk drive to read and write data to and from the plurality of recording disks 180, 182, and 184. Each slider corresponds to a single surface of one of the disks. Arms 104 and 110 each have a compensating swage plate 300. Plates 300 will be discussed in more detail below.

Figure 4:
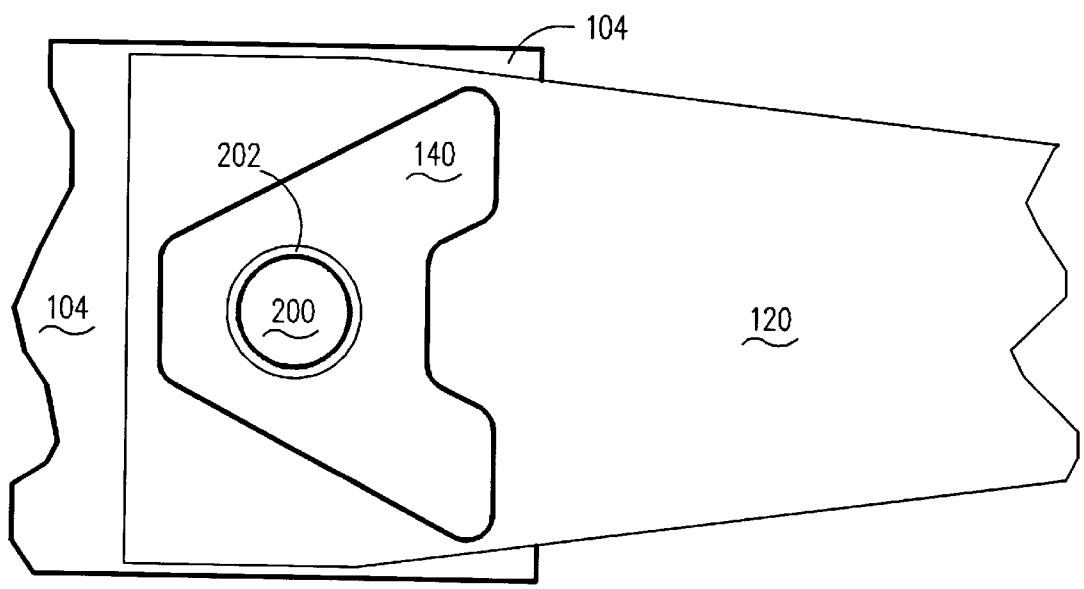
FIG. 4 is a bottom view of an actuator arm of FIG. 3.

FIG. 4 shows a bottom view of arm 104 and suspension 120. The arm 104 has a swage aperture 200 which passes through the arm. Swage plate 104 is spot welded to suspension 120. A portion of plate 140, known as the swage spud 202 fits into aperture 200. After the swaging process, suspension 120 is held firmly in place against arm 104 by plate 140.

Figure 5:
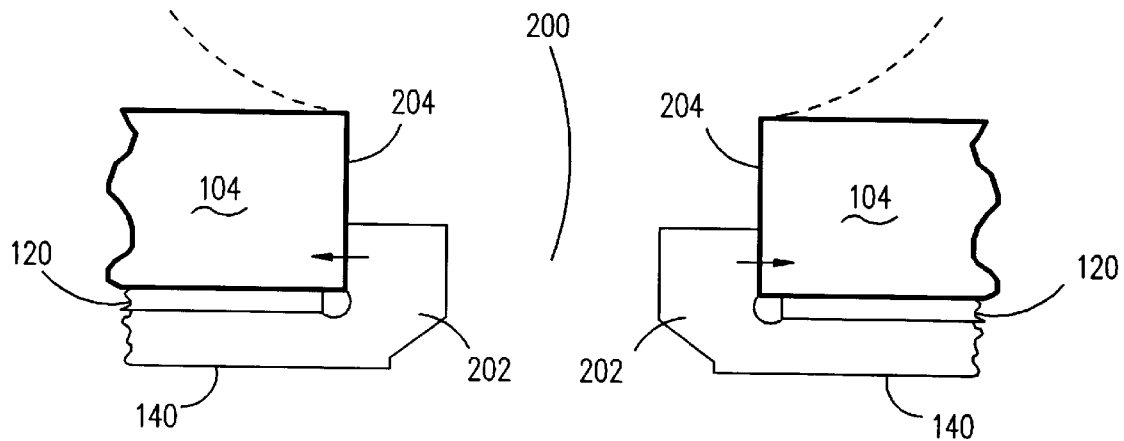
FIG. 5 is a cross sectional view of an actuator arm with a single swage plate.

FIG. 5 shows a cross sectional view of the arm, suspension 120, and swage plate 140. The compensating plate 300 is not shown for purposes of this discussion. It can be seen that the circular swage spud 202 fits into the swage aperture 200. During manufacture, a swage ball (also known as a swage tool) is passed through aperture 200. The ball compresses the inner diameter of the spud 202 such that it exerts an outward force against the walls 204 of aperture 200. This force holds the swage plate 140 securely in place. The arrows show the force exerted on the inner walls 204 of arm 104.

Returning now to FIG. 3, the operation of the actuator arm assembly 100 may now be understood. For purposes of the following discussion, it is assumed that the compensating plates 300 of the present invention have not been installed. The rotary actuator 36 moves the assembly 100 to position the transducer elements on the sliders on the desired track on each of the disks 180–184. As the disks rotate below the sliders, an air bearing is created between each slider and each disk. This air bearing lifts the slider off of the disk surface a very small distance, typically in the range of 40 nm to 60 nm. The air bearing lifting forces are shown as arrows next to each of the sliders.

In order to resist the lifting force, each suspension exerts a force towards the disk surface (known as the gram load). The gram load is typically around 4 grams. Having the proper gram load is critical to maintaining the sliders at the proper flying height above each disk.

As can be seen in FIG. 3, the middle actuator arms 106 and 108 receive equal and opposite lifting forces from their two suspensions. The lifting forces cancel each other out and the middle actuator arms remain stationary in the vertical direction (perpendicular to the surface of the disk). The weight of each suspension and slider is very small (on the order of one hundred milligrams) compared to the gram loads and for purposes of this discussion are ignored.

The end actuator arms 104 and 110 each have only a single suspension on one side. Actuator arms 104 and 110 thus each experience a single lifting force without a corresponding force from another suspension. This lifting force will slightly deflect the end actuator arms. The top actuator arm 104 is deflected slightly upward and the bottom actuator arm 110 is deflected slightly downward. Because these arms are deflected away from the disks, the spring force (gram load) exerted by these single suspensions is reduced. The gram loads on suspensions 120 and 130 are reduced approximately 0.25 grams to a total of 3.75 grams. This causes the sliders 160 and 170 to fly at a greater flying height than desired and this causes an increased data error rate.

This flying height problem is compounded by the swaging process. See FIG. 5. End arm 104 is shown having only a single swage plate 140 on the single side of the arm which has the single suspension 120. Note that the single swage exerts outward forces as shown by the arrows. Because these forces are asymmetrical with respect to the center line of the arm, the forces tend to bend the arm tip 104 upward. The dotted lines show an exaggerated view of the displacement of the top surface of arm 104. This upward deflection further reduces the gram load by about 0.25 grams. The gram load is reduced because the arm tip curves away from the disk, causing the mount plate and suspension to bend away from the disk. So the total gram load now experienced by suspension 120 is reduced from 4.0 to 3.5 grams. This causes slider 160 to fly even further above disk 180 and further increases the data error rate. The arm 110 experiences a similar deflection due to the single swage. The middle arms 106 and 108 do not experience this deflection because they both have swages on both sides and the swage forces cancel each other out, thus the arm tips remain straight. Thus, the inventors have discovered that the end actuator arms have a higher number of data errors because of the combined effects of an unbalanced lifting force and an unbalanced swage force.

Figure 6:
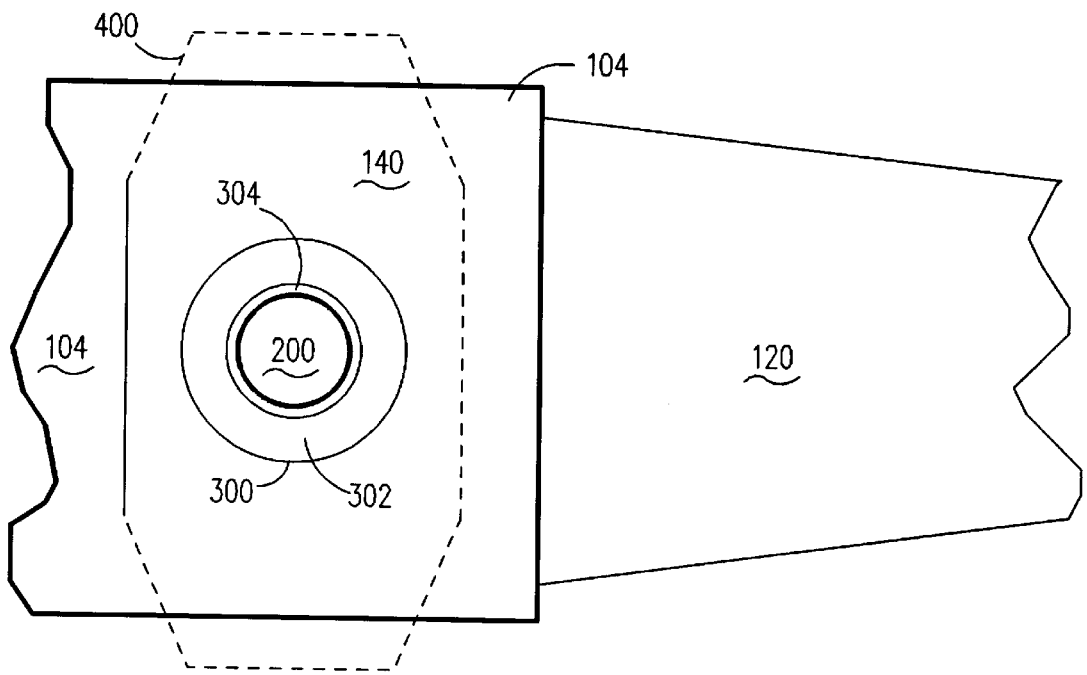
FIG. 6 is a top view of an actuator arm with a swage plate and a compensating plate.
Figure 7:
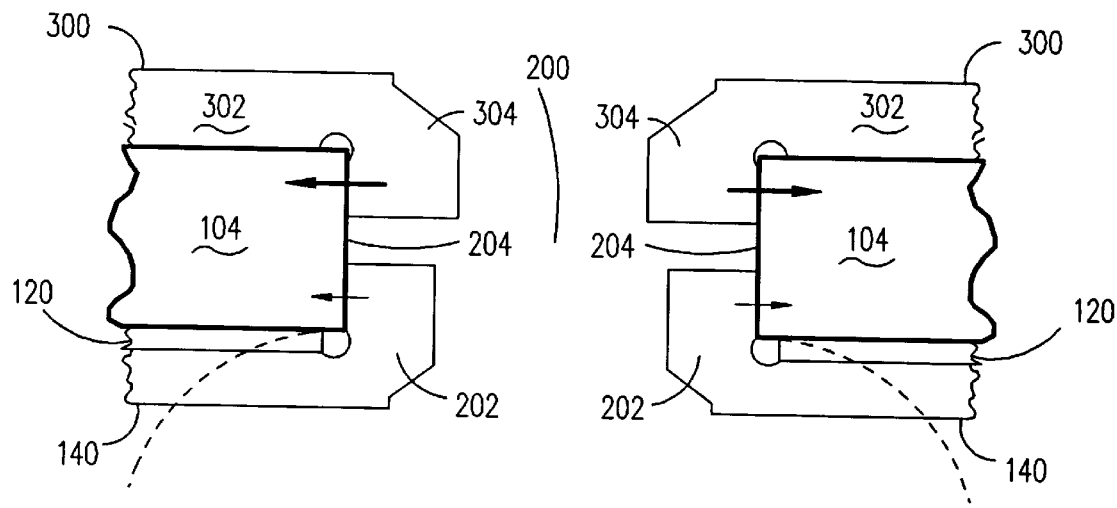
FIG. 7 is a cross sectional view of the compensating plate of FIG. 6.

FIGS. 6 and 7 show a top view and cross sectional view, respectively, of actuator arm 104 with a compensating swage plate 300. Compensating swage plate 300 is a circular plate which has a flat lip section 302 which lies flat against arm 104. In a preferred embodiment, the lip section 302 has a thickness equal to the combined thickness of the plate 140 and suspension 120. Lip section 302 has a diameter smaller than the width of plate 140. A spud section 304 extends into aperture 200 a distance equal to the distance which spud 202 of plate 140 extends into the aperture from the opposite side. The spud 304 has a larger amount of volume than spud 202. This is accomplished by giving spud 304 a smaller inner diameter than the inner diameter of spud 202. During the swaging process, swage plates on one side of the actuator arm (top side for example) are put in place and a swage ball is passed vertically through all the swage apertures in the arm stack, swaging the top plates in place. Swage plates on the other sides are then put in place (bottom sides for example) and the swage ball is passed through the swage apertures in the opposite direction, swaging the remaining plates in place. Alternatively, all swage plates can be inserted at once and swaged with one or more passes of swage balls.

The extra volume added to the spud 304 compared to spud 202 is such that after the swaging process is complete, the spud 304 will exert a greater outward force against wall 204 than spud 202. The net force will cause arm tip 104 to want to bend in a downward direction. The dotted line shows an exaggerated view of the bending line of bottom surface of arm 104. The downward curvature of the arm tip causes the mount plate and suspension to rotate toward the disk, resulting in a higher gram load. This effect when combined with the lower gram load produced by the unbalanced lifting force discussed earlier results in a zero gram load change.

The suspension now can exert the proper gram load against the air bearing and the slider will fly at the proper fly height, thereby reducing the amount of data errors. A similar compensating plate is used on the bottom side of bottom arm 110.

The amount of compensation needed for the equalizer plate to be determined in the following manner. First, the amount of gram load loss $\Delta L_1$ due to the unbalance lifting forces must be determined. One means is to simultaneously measure the gram load of both suspensions swaged to the tip of a single actuator arm. Then measure the decrease in load of each suspension when the opposite suspension is totally unloaded to its free state. The average of these two load changes is a gram load decrease due to unbalanced lifting force.

Another means is to use finite element analysis to calculate the deflection and rotation of the arm tip when the nominal lifting force is applied at the slider. The deflection of a geometric plane attached to the mount plate calculated along an axis perpendicular to the disk and passing through the center of the slider multiplied by the vertical stiffness of the suspension gives the calculated decrease in gram load.

Second. The decrease in gram load $\Delta L_2$ due to unbalance swage forces must be determined. One means is to measure the difference in gram load of a suspension swaged to one side of an actuator arm tip before and after swaging a suspension to the other side of the arm tip. The decrease in gram load due to the unbalanced swage forces is the difference between the higher load of this suspension when both suspensions are swaged, but only the first suspension is being measured, and the lower gram load of the first suspension when only it is swaged to the arm tip.

Another method is to use finite element analysis to simulate the expansion of a single spud into the arm tip. The deflection of a geometric plane attached to the mount plate calculated along and axis perpendicular to the disk and passing through the center of the slider multiplied by the vertical stiffness of the suspension gives the calculated decrease in gram load.

Third. The combined decrease in gram load is the sum of the decrease due to unbalanced lifting forces and unbalanced swaged forces. The compensation that can be achieved with an equalizer plate with the same size spud and same swage ball size is limited only to compensation for the second effect: unbalanced swage forces.

Fourth. To determine the increase in spud volume or the increase in swage ball size to fully compensate for both effects discussed, the following calculations must be made.

1) Calculate the ratio of total compensation needed to the compensation achieved by equalizing the swage effect alone.

Compensation ratio (R) equals $(\Delta L_1 + \Delta L_2) / \Delta L_2$.

$\Delta L_1$ equals the load decrease due to unbalanced lifting force.

$\Delta L_2$ equals the load decrease due to unbalanced swage force.

By observation R is greater than unity.

2) Calculate the amount of solid diametrical interference of the suspension spud during swaging. Due to assembly clearances needed for insertion of the suspension spud into the arm hole, some of the expansion of the spud remains clearance without distorting the arm tip. The amount of expansion of the spud after clearances are removed is calculated as follows:

Solid diametrical interference (SDI)=(BO−SI)−(AI−SO).

BO equals outside diameter of swage ball.

SI equals inside diameter of spud.

SO equals outside diameter of spud.

AI equals inside diameter of arm hole.

3) Calculate the needed solid diametrical interference for total compensation.

SDI' equals R*SDI.

Note that since R is greater than unity, the needed solid diametrical interference is greater than that achieved with the nominal swage ball or nominal spud volume.

4) Calculate the increase in swage ball size or increase in swage volume. The calculated larger swage ball size, BO', to give total compensation with a nominal spud size is BO'=BO+(SDI'−SDI).

Alternatively, the calculated increase swage spud volume can be calculated, using a smaller spud inside diameter.

SI'=SI−(SDI'−SDI).

Both methods gives the same amount of increased solid diametrical interference which will fully compensate for the gram load loss due to unbalanced lifting force and unbalanced swage force.

In a preferred embodiment, the actuator arm tips are 0.57 mm thick and have an aperture diameter of 2.77 mm. The plate 140 has a spud 202 having an outer diameter of 2.73 mm and an inner diameter of 1.995 mm and extends a distance 0.21 mm into the aperture. The plate 300 has a spud 304 having an outer diameter of 2.73 mm and an inner diameter of 1.92 mm and extends a distance 0.21 mm into the aperture. Both plates 300 and 140 are made of stainless steel.

An alternative embodiment may be used in a special case known as a depopulated drive. Large capacity disk drives are typically designed to mount a certain number of disks. In certain cases it may be desirable to also offer a lower cost/lower capacity disk drive. Rather than design a whole new disk drive, the same disk drive is used with one or more disks and their associated heads and suspensions removed. Such drives are known as depopulated disk drives.

For example, in FIG. 3, disk 184 may be removed along with suspensions 130 and 128, sliders 170 and 168, and plates 300, 150 and 148. In place of plates 150 and 148 a large and heavy counterbalance plate is swaged. The mass of the counterbalance plate is approximately equal to the mass of a suspension, slider, and regular swage plate. This is done so that the inertial mass of the actuator arm disk stack remains balanced. However, now arm 108 only has a single suspension and experiences the same unbalanced forces described above.

The present invention may be adapted to this counterbalance plate. FIG. 6 shows a dotted line representing a compensating plate 400. Plate 400 has a thickness and spud similar to plate 300. The only difference is that plate 400 has a much greater width and length such that its mass is now approximately equal to the mass of a suspension, slider, and normal mounting plate. In the depopulated drive, arm 108 has only one suspension on its top surface. Plate 400 may be used as the equalizer plate on the bottom surface. The larger spud of plate 400 causes the arm 108 to want to deflect upward such that the lifting force from the disk is equalized and the arm 108 remains stationary. The slider 166 of arm 108 remains at its proper flying height.

Figure 8:
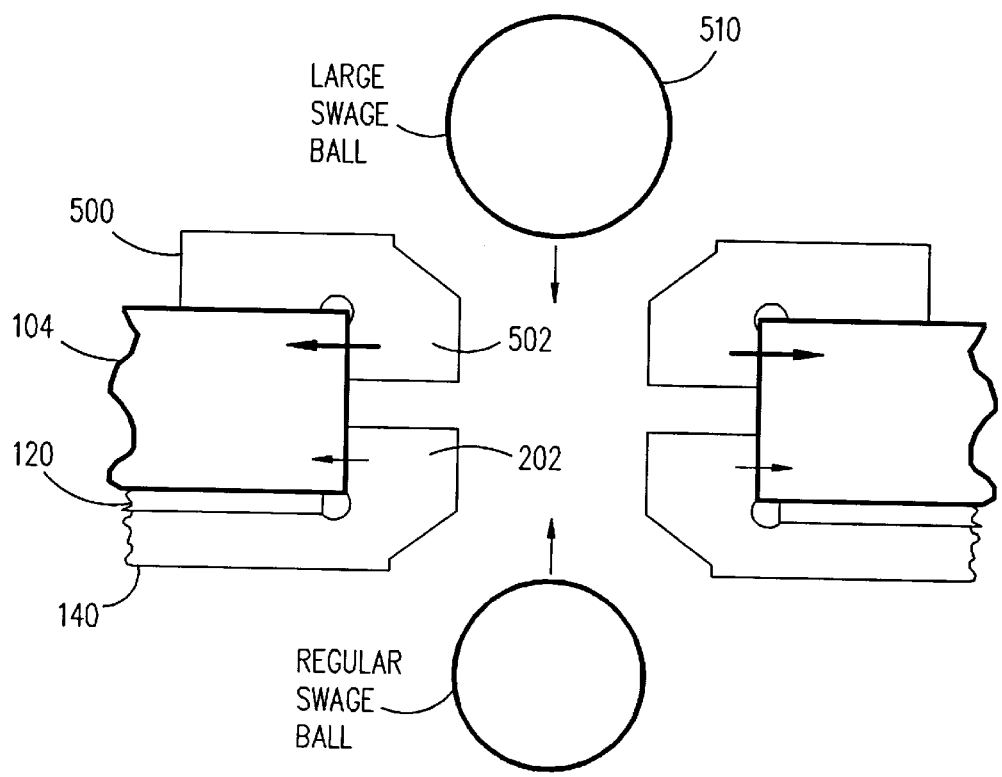
FIG. 8 is a cross sectional view of a swage process of the present invention.

FIG. 8 shows a cross sectional view of an alternative swaging process of the present invention. Arm 104 has a compensating plate 500 on the top surface. Plate 500 is similar to plate 300 except that the mass of the spud 502 is approximately equal to the mass of spud 202 of plate 140. In a preferred embodiment the inner diameters of spuds 502 and 202 are equal.

During the manufacturing process, plate 500 is placed on the top surface of arm 104. A large swage ball 510 is passed through the aperture in a downward direction. The large swage ball has a diameter of 2.18 mm. Alternatively, a swage ball with a diameter of 2.11 mm could be followed with a large ball with a diameter of 2.18 mm.

Next, the suspension 120 and plate 140 are attached to the lower surface of arm 104 and a normal size swage ball (smaller than the large swage ball) is passed through the aperture in the upward direction. The normal swage ball has a diameter of 2.11 mm.

The diameters of the swage balls are determined as described above in the discussion of how to determine the amount of compensation needed for the equalizer plate.

Spud 502 is compressed to a greater degree than spud 202 and exerts a greater outward force on wall 204 of arm 104. The effect is the same as described before. Arm 104 wants to bend in a downward direction, compensating for the lifting force. Arm 104 remains in the desired stationary position such that slider 160 is at the proper flying height. A similar plate 500 and similar swage process may be used for the lower arm 110.

Although the present invention has been described for use in disk drives having multiple disks, the invention may also be used in drives having a single disk with two actuator arms each having a single suspension.

While the preferred embodiments of the present invention have been illustrated in detail, it should be apparent that modifications and adaptations to those embodiments may occur to one skilled in the art without departing from the scope of the present invention as set forth in the following claims.

We claim:

1. A suspension system comprising:
   an actuator arm having a first side and a second side;
   a single suspension connected to the actuator arm, the suspension for supporting a transducer which rides on a fluid bearing above a moving storage medium;
   a first swage plate having a first swage spud which extends through the suspension into a first aperture on the first side of the actuator arm; and
   a second swage plate which has a second swage spud which extends into the first aperture on the second side of the actuator arm without overlapping the first swage spud, the second swage spud providing a compensating force to the actuator arm to compensate for the unbalanced force exerted by the fluid bearing on the suspension.

2. The system of claim 1, wherein the second swage plate provides a second compensating force to the actuator arm to compensate for any unbalanced force exerted by the attachment of the suspension to the actuator arm with the first swage plate.

3. The system of claim 1, wherein the second swage spud of the second swage plate has sufficient volume such that when the second swage spud is swaged it exerts a force sufficient to compensate for the fluid bearing force.

4. The system of claim 1, wherein the second swage spud of the second swage plate is swaged using a swage ball having a sufficient diameter to exert a force on the second swage spud to compensate for the fluid bearing force.

5. The system of claim 1, wherein the actuator arm is an end actuator arm located on the end of a stack of a plurality of actuator arms.

6. A data storage system comprising:
   an actuator arm having a first side and a second side;
   a single suspension connected to the actuator arm, the suspension for supporting a transducer which rides on a fluid bearing above a moving storage medium;
   a first swage plate having a first swage spud which extends through the suspension into a first aperture on the first side of the actuator arm;
   a second swage plate which has a second swage spud which extends into the first aperture on the second side of the actuator arm without overlapping the first swage spud, the second swage spud providing a compensating force to the actuator arm to compensate for the unbalanced force exerted by the fluid bearing on the suspension;
   a transducer attached to the suspension;
   a data storage medium located proximate to the transducer;
   a medium movement device for moving the medium;
   a transducer movement device for moving the transducer relative to the medium; and
   an electronic device connected to the transducer for reading data from the medium.

7. The system of claim 6, wherein the second swage plate provides a second compensating force to the actuator arm to compensate for any unbalanced force exerted by the attachment of the suspension to the actuator arm with the first swage plate.

8. The system of claim 6, wherein the second swage spud of the second swage plate has sufficient volume such that when the second swage spud is swaged it exerts a force sufficient to compensate for the fluid bearing force.

9. The system of claim 6, wherein the second swage spud of the second swage plated is swaged using a swage ball having a sufficient diameter to exert a force on the second swage spud to compensate for the fluid bearing force.

10. The system of claim 6, wherein the actuator arm is an end actuator arm located on an end of a stack of a plurality of actuator arms.

* * * * *